Figure 1:
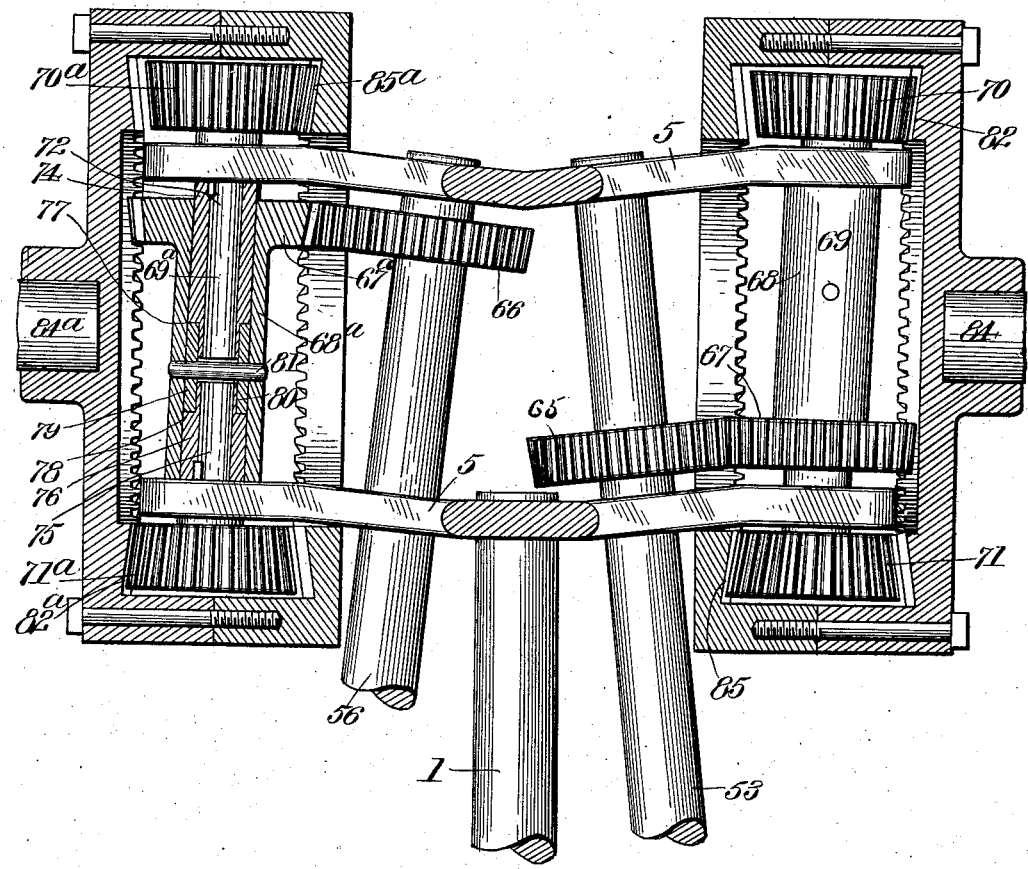

H. M. CAKE.
CHANGE SPEED GEARING.
APPLICATION FILED SEPT. 15, 1909.

1,027,236.

Patented May 21, 1912.

3 SHEETS—SHEET 1.

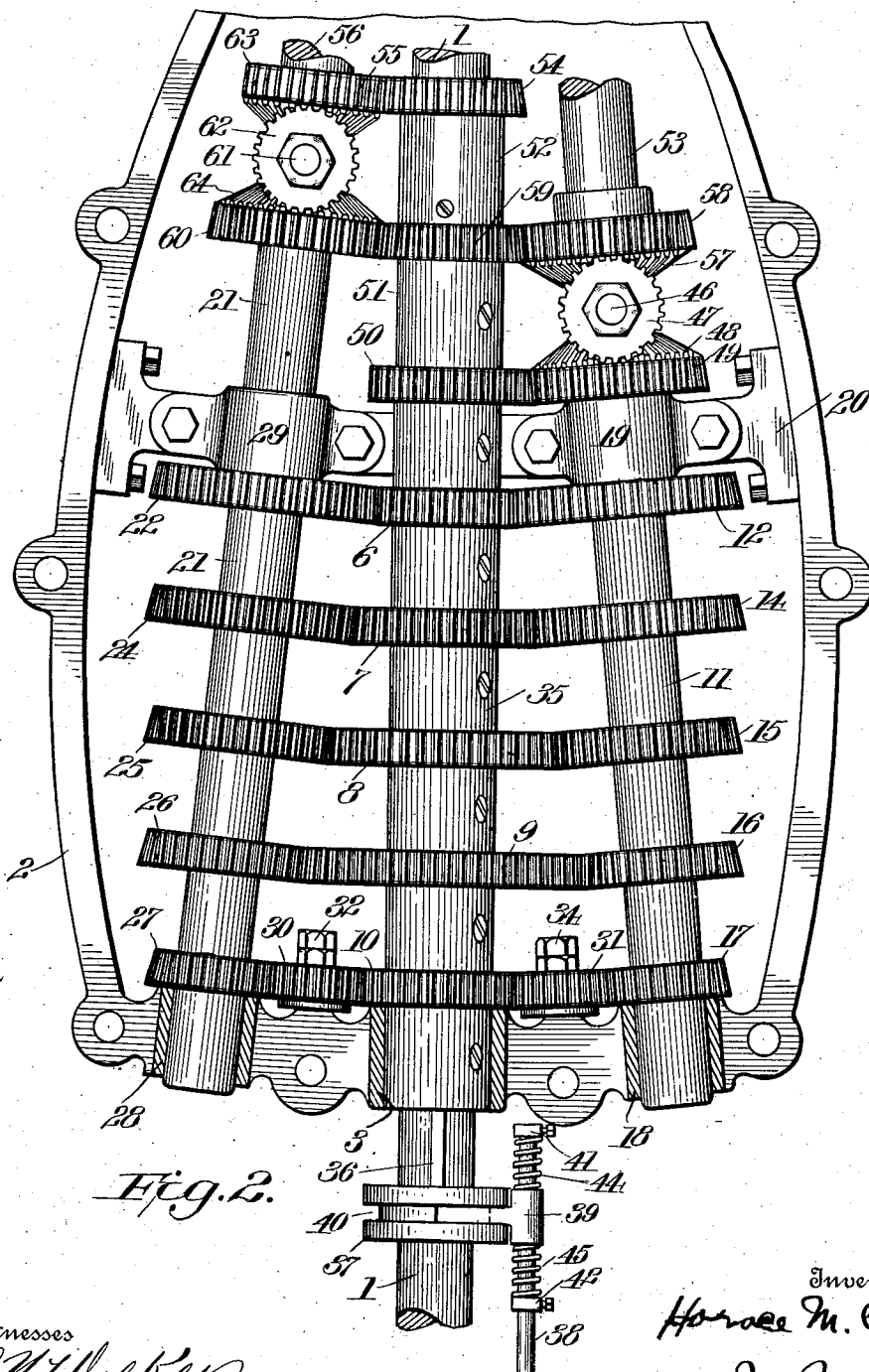

H. M. CAKE.
CHANGE SPEED GEARING.
APPLICATION FILED SEPT. 15, 1909.
1,027,236.
Patented May 21, 1912.
3 SHEETS—SHEET 3.
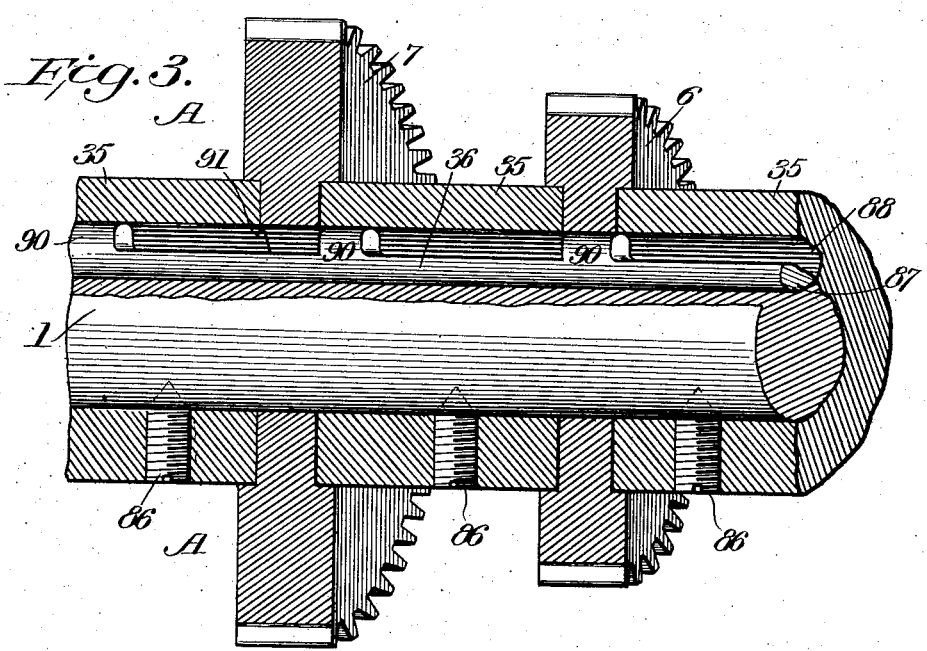
Witnesses
Inventor
Horace M. Cake
By Geo. W. Ramsey
Attorney
COLUMBIA PLANOGRAPH CO., WASHINGTON, D. C.

UNITED STATES PATENT OFFICE.

HORACE M. CAKE, OF WASHINGTON, DISTRICT OF COLUMBIA.

CHANGE-SPEED GEARING.

1,027,236.  Specification of Letters Patent.  Patented May 21, 1912.

Application filed September 15, 1909. Serial No. 517,812.

*To all whom it may concern:*

Be it known that I, HORACE M. CAKE, a citizen of the United States, residing at the city of Washington, in the District of Columbia, have invented certain new and useful Improvements in Change-Speed Gearing, of which the following is a specification.

This invention relates generally to the art of gearing and specifically to a change speed and transmission gearing whereby power is transmitted, from a driving member, through shafts at angles to each other, with a minimum loss of effective energy.

The principal object of the invention is to construct mechanism to minimize side thrust in the bearings which carry the transmission shafts.

A further object of the invention is to construct a transmission gearing in which the power is transmitted through separate shafts, geared to a driving shaft in such manner as to take power from each side of the driving shaft and deliver the power to each side of driven shafts, thereby equalizing the transmission strains and stresses on the intermediate gears.

Another object of the invention is to provide a novel compound differential mechanism whereby power is transmitted through separate shafts.

A still further object of the invention is to provide a change speed and transmission gearing for an automobile or like machine, in which the power is transmitted through a central shaft, and from each side of which power is transmitted to the driving road wheels respectively, thus balancing the condition of stress and strain in the transmission gears.

This invention which is believed to be broadly new, is for this reason susceptible of structural changes without departing from the scope thereof, but a preferred form will be hereinafter specifically described by reference to the drawings, and the scope of the invention will be indicated by the claims.

In the accompanying drawings, in which like numerals represent like parts throughout the several figures:—Figure 1, is a detached plan view of the rear axle transmission gearing showing certain parts in section. Fig. 2, is a plan view of the change speed transmission gearing. Fig. 3, is a sectional elevation showing the clutch mechanism. Fig. 4, is a transverse section taken on line A—A of Fig. 3. Fig. 5, is a diagrammatic detail of the compound differential mechanism.

In the preferred form of my invention illustrated in the drawings, the middle shaft is connected to the engine, motor or other source of power. On either side of the middle shaft are other shafts which transmit power respectively to the road wheels. Gears of varying ratio arranged in series, are carried upon, and rigidly attached to, the side shafts. These gears are in continual mesh with gears, loosely mounted on the middle shaft, which are adapted to be clutched one at a time to the middle or power shaft. As it is the purpose of the side shafts to transmit power to the road wheels, it becomes necessary to have a differential gearing between each side shaft and each road wheel, therefore I have arranged a double, compound, differential, which is geared to and between the side shafts. This differential gearing permits of an equalization of power between the road wheels. A short shaft extends beyond each differential and terminates in a bevel gear which intermeshes in a gear on a compensating member between two small bevel gears that engage large annular gears on the wheel axles; thus the transmission from the power shaft to the road wheels is effected.

Referring to the drawings and more particularly to Fig. 2, the main drive shaft 1, which is connected by means of a clutch mechanism, not shown, to the engine, motor or other source of power, occupies the central position in a gear casing 2, and has a bearing 3 in one end of the gear casing 2, and its other bearing 4 in the gear frame 5. The main drive shaft 1 carries thereon a series of gears 6, 7, 8 and 9, which are arranged in order of their size. Near the bearing 3 is a much smaller gear 10. All of the gears 6, 7, 8, 9 and 10 are loosely mounted upon the driving shaft and are adapted to be clutched rigidly thereto by means of a mechanism which will be more particularly described hereinafter. A shaft 11 is mounted to the right of the main drive shaft 1, and carries rigidly attached thereupon, a series of gears 12, 14, 15, 16 and 17 which are in continual mesh with the gears 6, 7, 8, 9 and 10 respectively on the main drive shaft. This shaft 11 is mounted in the bearing 18 which is carried by the casing 2, and in the bearing 19 which is carried by the brace frame 20 bolted to the gear box. A like shaft 21 is arranged on the left of the main drive shaft, and carries rigidly mounted thereon, a series of gears 22, 24, 25, 26 and 27. This shaft is similarly mounted in the bearing 28, carried by the gear casing 2, and a bearing 29 which is carried by the brace member 20. Gears 30 and 31 are carried upon studs 32 and 34 respectively, which are bolted into the gear casing 2. The gears 30 and 31 mesh with the gear 10 on the driving shaft, and with gears 17 and 27 on the side shafts respectively. The gears 10, 30, 17, 31 and 27 form a reversing, or change motion, gearing. Carried upon the main drive shaft 1 are a series of collars 35 which form side bearings for the several gears carried upon the main drive shaft, and also form a housing for the clutch rod 36, which terminates in a grooved collar 37.

The actuating rod 38 passes through a fork 39, which fits into a groove 40 on the collar 37. The actuating rod 38 is loosely mounted in the forked member 39, and carries the stops 41, 42 which may be rigidly attached to the actuating rod 38. Between the stops 41, 42, and the forked member 39, are coiled springs 44, 45. The function of these springs will be explained hereinafter.

The shaft 11 to the right of the main drive shaft 1 terminates in a pin 46 which carries thereupon pinion 47. This pinion engages upon one side with the beveled gear 48 which is loosely mounted upon the shaft 11. The beveled gear 48 is formed with a second gear face 49, which engages the gear 50 loosely mounted upon the main drive shaft 1. This gear 50 is integral with the tubular member 51, which is rigidly connected, by means of hard solder, pin, key or other fastening means, to the tubular member 52 with which the gear 54 is integral. The gear 54 meshes with a gear 55 carried by the short shaft 56. The other side of the pinion 47 meshes with the beveled gear 57 rigid on the short shaft 53. The gear 57 also carries a second gear face 58 in mesh with the gear 59, which is mounted to revolve upon the tubular member 51 and meshes with the gear 60 loosely mounted on shaft 21.

The shaft 21 to the left of the main drive shaft 1, terminates in a pin 61 which carries pinion 62. This pinion 62 meshes with the beveled gear 64 integral with the gear 60, which is loosely mounted upon the shaft 21. The pinion 62 also meshes with the beveled gear 63 which is rigidly mounted upon the short shaft 56.

Referring more particularly to Fig. 1, in which the parts are of a substantially duplicate character, it is thought they will be better understood if discussed and described in this relationship, and therefore the parts will be referred to by double characters. The shafts 53 and 56 carry gears 65 and 66 respectively which are in mesh with transmission gears 67—67ª. These transmission gears 67—67ª are formed with long tubular shanks 68—68ª which are arranged and adapted to drive an equalizing compensating mechanism, which will be hereinafter specifically described. The compound shafts 69—69ª (which carry the compensating gears 70—70ª and 71—71ª) are each formed in two sections which are arranged in axial alinement with each other, and which are maintained in this relationship by means of the tubular shanks 68—68ª.

Referring to the short compound shaft, which is shown in section at the left of Fig. 1, the shaft 72 carries the collar 74, and to the other shaft 75 is fastened a similar collar 76. These collars 74 and 76 may be firmly secured to the shafts 72 and 75 respectively by being welded or brazed thereon, or by means of pin, key or other construction whereby it is assured that they will positively turn with the shafts. The collar 74 is formed with a recess 77, and the other collar 76 is formed with a similar recess 78. The recesses 77 and 78 of the respective collars, are arranged opposite each other, and are adapted to receive the ends of a pair of eveners 79 and 80, whose engaging ends intermesh with recesses after the manner of the teeth in the differential gear mechanism. The eveners 79 and 80 are carried upon a pin 81, which is secured to the tubular shank 68 of the transmission gear 67ª in such manner that the power transmitted through the transmission gear, is delivered by means of the pin 81 through the eveners 79 and 80 to the collars 74 and 76, thus by means of the compound shaft it is communicated to the compensating gears 70ª—71ª carried upon the ends of said shafts 72 and 75. The gears 70—71, to the right of the drawing, in Fig. 1, are carried by a like compound shaft and evener mechanism. The compensating gears 70—71ª are in mesh with large annular gears 82—82ª which are rigidly attached to the road wheel shafts 84—84ª. The compensating gears 70ª—71 are in mesh with annular gears 85—85ª which are the same size and number of teeth, and which are bolted to annular gears 84—84ª respectively. The annular gears 85—85ª are formed with circular openings in order to permit the gear frame 5, carrying the compound shafts and compensating gears, to be inserted between the gears 82—85 and 82ª—85ª, in order to drive the road shafts.

Referring specifically to Fig. 3, the main drive shaft 1 is surrounded by collars 35. Between these collars are carried the gear wheels 6 and 7, which are under-cut or recessed in order to make a better bearing when they are running loose upon the main drive shaft. The collars 35 are rigidly attached to the main drive shaft by means of the screw dowel pins 86. The main shaft 1 contains a semi-circular groove 87, and the collars contain a similar groove 88 which is directly over the groove in the main drive shaft. A series clutch rod 36 is adapted to lie in the opening formed by the groove in the main drive shaft and a similar groove in the collars. The major portion of this series clutch rod is turned of such shape that when lying in the groove of the main drive shaft it completes the cylindrical surface of said drive shaft. At regularly spaced intervals on the said clutch rod 36 are cylindrical clutch members 90 which are adapted to pass into openings in the gear wheels 91, thereby rigidly attaching said gears to said drive shaft 1 by means of a wedging action similar to that effected by a key. The distance between the cylindrical portions 90, on the series clutch rod 36, is arranged such that as the clutch rod is moved endwise the various transmission gear wheels carried by the main drive shaft will be clutched rigidly to said shaft in regular procession of the series gears.

The cylindrical portion 90 on the clutch rod which engages the reverse gear 10, is so arranged that it can only be thrown into action with said reverse gear wheel after the lowest speed gear 6 has been passed in moving the clutch rod, thus permitting the reverse gear to be thrown in only after the lowest speed gear has been in actuation.

As the openings in the various gears are not always in a line to receive the cylindrical portion 90 of the series clutch rod, as the actuating rod 38 is moved, one of the springs 44, or 45, is compressed and automatically throws the cylindrical portion of the series clutch rod into a proper opening in the transmission wheel when said wheel comes into proper relation to receive said cylindrical portion of the clutch rod.

Referring to Fig. 5, which is a small sectional diagrammatic view showing the relation of the various parts in the double differential gearing, it will be noted that the shafts 11 and 21 are always moving at the same rate of speed, and this fact must be taken into consideration in studying the action of the differential gearing. If the shaft 56 be held stationary then the pinion 62 will revolve, and the gear wheel 60 will be driven at twice the speed of the shaft 21 which is driving the differential pin 61 on which is revolubly mounted pinion 62. The gear wheel 60 which is loosely mounted upon the shaft 21, will transmit its motion through the gear 59 which is loosely mounted upon the tubular member 52 to the gear 58, and thus the shaft 53 will be driven at twice the speed of the shaft 11, or the shaft 21, and the pinion 47 will turn upon the gear 48 which is loosely mounted on the shaft 11, and is in engagement with the gear 50 on the tubular member 51—52, which carries the gear 54 in mesh with the gear 55 which is rigid upon the shaft 56. Since the shaft 56 is stationary, by tracing the intervening gears through it will be found that the gear 49 in the shaft 11 is also stationary, and that the gear 47 must therefore turn upon the gear 49. Thus it will be seen that the entire transmission gearing is acting in harmony, and if the shaft 56 is held stationary, the opposite shaft 53 must necessarily revolve at double speed. If the shaft 53 be held stationary, then by a similar interaction of gears, the shaft 56 will be found to revolve at double speed. Therefore it will be seen that this invention provides a compound differential gearing for two inter-related driving shafts in such a manner that each shaft may receive equalization of power due to differential mechanism.

The short shaft 56 is axially alined with the shaft 21 and is free to rotate independently of the shaft 21. A similar condition exists with reference to the shaft 53 and the shaft 11. The compound differential mechanism between the shafts 56 and 53, has its differentiating gears 62 and 47 located between the shafts 21 and 56 and between the shafts 11 and 53 respectively. For certain purposes it might be desirable to eliminate the compound differential mechanism, in which case the short shaft 56 would be a continuation of the shaft 21 and the shaft 53 would be a continuation of the shaft 11. Both the shafts 21 and 56, as both of the shafts 11 and 53, are driven shafts. However, in order to avoid confusion, particularly with reference to the claims wherein the elements include both the shafts 21 and 11 and the shafts 53 and 56, the shafts 21 and 11 will be designated as the rear driven shafts and the shafts 53 and 56 will be designated as the forward driven shafts.

I claim—

1. A change speed gearing comprising a driving shaft, gears loosely mounted on said driving shaft, driven shafts, gears on said driven shafts in mesh with the gears on said driving shaft, means including a differential mechanism operatively connecting both driven shafts and means for clutching any one of the gears on the driving shaft to said driving shaft, substantially as described.

2. A change speed gearing comprising a driving shaft, gears of varying sizes loosely mounted upon said driving shaft, driven shafts, gears on said driven shafts in constant mesh with the gears on the driving shaft, means including a differential mechanism operatively connecting said driven shafts and means for clutching the loosely mounted gears to the driving shaft, said means being adapted to clutch in the said loosely mounted gears in the order of their relative size.

3. A change speed transmission gearing comprising a driving shaft, gears of varying sizes loosely mounted on the driving shaft, driven shafts, gears of varying sizes rigidly mounted upon the driven shafts, means for clutching the loosely mounted gears to the driving shaft, means including differential gear mechanism operatively connecting both driven shafts, road wheel shafts, and means for connecting said differential mechanism with the road wheel shafts.

4. In an automobile transmission gearing, in combination, a driving shaft, driven shafts, one on each side of said driving shaft and lying at an angle thereto, a series of beveled gears of varying sizes loosely mounted upon said driving shaft, a series of beveled gears of varying sizes rigidly mounted upon said driven shafts and in mesh with the gears upon said driving shaft, and clutch means for connecting any one of the loosely mounted gears with the driving shaft, and means including differential gear mechanism operatively connecting both driven shafts, substantially as described.

5. In a transmission gearing in combination, a driving shaft, a gear on said driving shaft, driven shafts, gears on said driven shafts in mesh with the gear on said driving shaft, compound shafts operatively connected to said driven shafts, gears carried upon said compound shafts, and annular gears adapted to mesh with said gears, substantially as described.

6. In a transmission gearing in combination, a driving shaft, driven shafts operatively connected with said driving shaft, compound shafts, gears carried by said compound shafts and meshing with said gears upon said driven shafts, gears on each end of said compound shafts, annular gears each formed with two gear faces the gears carried by one end of the compound shafts meshing with one face of the annular gears, and gears upon the opposite end of said compound shafts meshing with the other gear face of said annular gears, substantially as described.

7. In a transmission gearing in combination, a driving shaft, compound shafts, driven shafts operatively connected with said driving shaft, annular gears each formed with two gear faces of identical configuration with the teeth of one set of gear faces facing the teeth carried by the other set of gear faces, gears arranged on the compound shafts whose axes are at an angle to the center plane of said annular gears, equalizing means carried by said compound shafts and operative connections between said driven shafts and said equalizing means, substantially as described.

8. In a transmission gearing in combination, a driving shaft, driven shafts operatively connected with said driving shaft, parallel shafts operatively connected with said driven shafts, road wheel shafts and means for conveying motion from diametrically opposite points of said parallel shafts to diametrically opposite points of said road wheel shafts.

9. In a transmission gearing in combination, a driving shaft, driven shafts operatively connected with said driving shaft, road wheel shafts, double annular gears carried by said road wheel shafts, gears in mesh with said double annular gears, and means including equalizing mechanism for operatively connecting said gears with said driven shafts.

10. In a transmission gearing in combination, a driving shaft, driven shafts operatively connected with said driving shaft, compound shafts, gears on said compound shafts, annular gears in mesh with said gears, road wheel shafts carrying said annular gears, means for operatively connecting said compound shafts with said driven shafts, and a frame for maintaining said compound shafts in parallel relation.

11. In a transmission gearing in combination, a driving shaft, driven shafts operatively connected with said driving shaft, road wheel shafts, double annular gears carried by said road wheel shafts, and means including parallel compound shafts for transmitting power from said driven shafts to opposite sides of said double annular gears.

12. In a transmission gearing in combination, a driving shaft, driven shafts operatively connected with said driving shaft, road wheel shafts, double annular gears each having two gear faces carried by said road wheel shafts, actuating gears engaging said annular gears, compound shafts carrying said actuating gears intermediate the said faces of the annular gears, and means including evener mechanism for operatively connecting said compound shafts with the driven shafts.

13. In combination, a driving shaft, driven shafts operatively connected with said driving shaft and a double differential gearing mechanism, one side of said double differential gearing being operatively connected with one driven shaft and the other side of said double differential gearing being operatively connected with another driven shaft, substantially as described.

14. In combination a driving shaft, driven shafts operatively connected with said driving shaft and means including a double differential gearing mechanism operatively connecting said driven shafts.

15. In combination a driving shaft, driven shafts operatively connected with said driving shaft and arranged upon opposite sides thereof, and means including a double differential gearing mechanism operatively connecting said driven shafts.

16. In a transmission gearing, the combination of a driving shaft, road wheel shafts, compound parallel shafts, driven shafts operatively connected with said driving shaft, bevel gears carried by the outer ends of said driven shafts, gears upon the compound parallel shafts and in mesh with said bevel gears, bevel gears on the ends of said compound parallel shafts, and annular gears attached to the road wheel shafts.

17. In a transmission gearing, the combination of a driving shaft, road wheel shafts, parallel compound shafts, driven shafts, one on each side of said driving shaft, operative means for connecting said driven shafts with said driving shaft, gears on said parallel compound shafts, bevel gears carried by the outer ends of said driven shafts, said bevel gears meshing with the gears carried upon said compound shafts, gears carried by the outer ends of said compound shafts, equalizing mechanism between the gears carried by the outer ends of said compound shafts, and annular gears carried by the road wheel axles in mesh with said gears, carried by the outer ends of said compound shafts.

18. In an automobile transmission gearing in combination, a driving shaft, bevel gears of varying sizes loosely mounted upon said driving shaft, driven shafts on each side of said driving shaft, bevel gears of varying sizes rigidly mounted upon said driven shafts, collars carried by said driving shaft having an open space therein, a clutch rod provided with clutch portions operating in said open space in said collars, the loosely mounted gears upon said driving shaft being provided with openings which are adapted to coöperate with the clutch portions of the clutch rod, and means for actuating said clutch rod to clutch any one of said loosely mounted gears to the driving shaft in such manner as to rotate therewith.

19. In combination, a driving shaft, rear driven shafts operatively connected with said driving shaft, forward driven shafts, and compound differential gearing between each of said rear driven shafts and said forward driven shafts.

20. In combination, a driving shaft, rear driven shafts operatively connected with said driving shaft, forward driven shafts, compound differential mechanism connecting each of said forward driven shafts in such manner that both of the forward driven shafts are differentially connected with each of the rear driven shafts.

21. In combination, a driving shaft, rear driven shafts operatively connected with said driving shaft, forward driven shafts, differential mechanism connecting one of said rear driven shafts with both of said forward driven shafts and the other rear driven shaft with both of said forward driven shafts.

22. In combination, a driving shaft, a rear driven shaft, a forward driven shaft in axial alinement with said rear driven shaft, another rear driven shaft, another forward driven shaft axially alined with said second mentioned rear driven shaft, a pinion carried by said first mentioned rear driven shaft and operatively connected with both of said forward driven shafts, a pinion carried by said second mentioned rear driven shaft and operatively connected with both of said forward driven shafts, and means operatively connecting said driving shaft with both of said rear driven shafts.

23. In combination, a driving shaft, rear driven shafts, forward driven shafts, a tubular member rotatively mounted upon said driving shaft, gear members on each end of said tubular member, a gear rotatively mounted on said tubular member, pinions carried by one of said rear driven shafts, said pinions being operatively connected with one of said forward driven shafts and operatively connected with the loosely mounted gear carried by said tubular member, a gear carried by the other forward driven shaft in mesh with the gear carried by said tubular member, a pinion carried by another of the rear driven shafts, said last mentioned pinion being operatively connected with one of said forward driven shafts and operatively connected with the gear on one end of said tubular member, the gear on the opposite end of said tubular member being connected with the first mentioned forward driven shaft, and means operatively connecting said rear driven shafts with said driving shaft.

24. In combination, a driving shaft, two rear driven shafts, two forward driven shafts, means for transmitting power from one of said rear driven shafts to both of said forward driven shafts and for transmitting power from the other rear driven shaft to both of said forward driven shafts, and means for transmitting power from said driving shaft to each of said rear driven shafts.

25. In combination, a driving shaft, two rear driven shafts, two forward driven shafts, a rotative member intermediate all of said driven shafts, gear wheels on each end of said rotative member, a gear rotatively mounted upon said rotative member, pinions carried by one of said rear driven shafts, said pinions being operatively connected with one of said forward driven shafts and with said gear rotatively mounted on said rotative member, said gear rotatively mounted on said rotative member being operatively connected with the other forward driven shaft, pinions carried by the other rear driven shaft, said last mentioned pinions being operatively connected with the gear on one end of the rotative member and operatively connected with one of said forward driven shafts, the gear on the opposite end of said rotative member being operatively connected with the first mentioned forward driven shaft, and means operatively connecting the driving shaft with both of said rear driven shafts.

26. In combination, oppositely disposed rear shafts, oppositely disposed forward shafts, and compound differential gearing between each of the said rear shafts and said forward shafts.

27. In combination, a plurality of rear shafts, a plurality of forward shafts, and compound differential gearing between each of said rear shafts and all of said forward shafts.

28. In combination, oppositely disposed shafts arranged in pairs, a fixed gear on one shaft of each pair, planetary gears carried by the other shaft of each pair, and a loose gear mounted to rotate upon each shaft carrying planetary gears, and means connecting the loose gear of each pair of shafts with the fixed gear of the opposite pair of shafts.

HORACE M. CAKE.

Witnesses:
 ERNEST F. RILEY,
 F. M. MONYHAM.

Copies of this patent may be obtained for five cents each, by addressing the " Commissioner of Patents, Washington, D. C."